(No Model.)
A. KRIEGER.
INSERTIBLE SAW TOOTH.
No. 334,241. Patented Jan. 12, 1886.
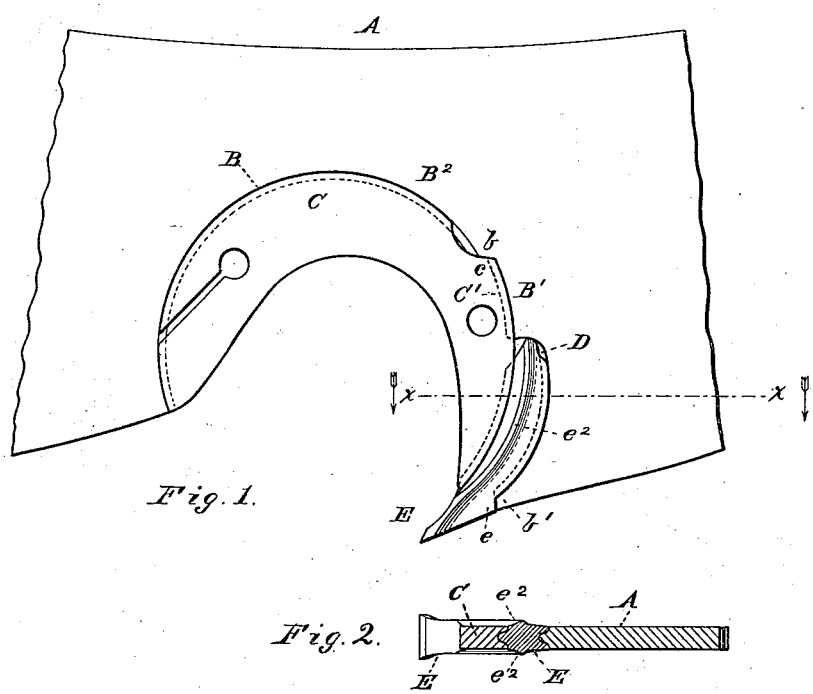
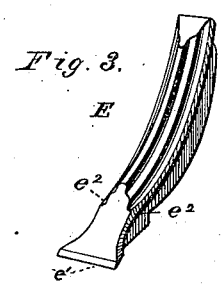
WITNESSES
INVENTOR
A. Krieger
by Anderson & Smith
his ATTORNEYS

UNITED STATES PATENT OFFICE.

ANDREW KRIEGER, OF COLUMBUS, OHIO, ASSIGNOR TO JAMES OHLEN, OF SAME PLACE.

INSERTIBLE SAW-TOOTH.

SPECIFICATION forming part of Letters Patent No. 334,241, dated January 12, 1886.

Application filed September 18, 1885. Serial No. 177,478. (No model.)

*To all whom it may concern:*

Be it known that I, ANDREW KRIEGER, a citizen of the United States, residing at Columbus, in the county of Franklin and State of Ohio, have invented certain new and useful Improvements in Inserted-Tooth Saws; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a side view. Fig. 2 is a detail view in section, taken where line $x\,x$ is marked on Fig. 1. Fig. 3 is also a detail view and shows the tooth in perspective.

This invention relates to improvements in teeth adapted to be inserted into saws, its object being to give the teeth such rigidity that they may endure the strain of the heaviest feed to which they may be subjected without breaking or bending out of shape.

The invention consists, essentially, in making the back of a saw-tooth on an arc of a circle of less radius than that on which its front is made, and locking it into a correspondingly-shaped socket, both the socket and tooth being properly grooved to retain the latter in place laterally.

Referring to the accompanying drawings by letter, A designates a portion of a saw in which the locking-socket B is made. The said socket has the shoulder $b$ a short distance inward from the tooth, against which a corresponding shoulder of the locking-piece bears when the latter is in place. The part B' of the locking-socket on the same side of the shoulder $b$ as the tooth goes deeper into the saw-plate, and is made on the arc of a circle of larger radius than the part B² on the opposite side of the shoulder. The edges of both parts, B' and B², are provided with tongues to enter corresponding grooves on the locking-piece. The outer portion of the part B' is cut away, and its edge made on an arc of a circle of less radius than the said part, to form the back of the tooth-socket.

$b'$ is a shoulder made on the outer corner of the tooth-socket, to bear against a corresponding socket on the tooth when the latter is in place.

C is the locking-piece, provided with the shoulder $c$ to abut against the shoulder $b$ of its socket. The part C' of the locking-piece fits upon the part B' of the socket B, and is grooved to accommodate the tongue of said part. A portion of the part C' of the locking-piece fits upon the part B' of the socket, and is grooved to receive the tongue of the same; but the remainder runs outward on the same radius, ending in a point slightly within the edge of the saw, and forms the front of the tooth-socket, is grooved, being continued outward to receive a tongue on the front edge of the tooth. The tooth-socket D is thus formed by the cut-away portion of the part B' of the locking-socket and a portion of the part C' of the locking-piece. The tooth-socket is grooved on its front edge and tongued on its rear edge or back.

E is a saw-tooth, having its rear edge made on the arc of a circle of less radius than that on which its front edge is made. The tooth fits within the socket, being provided with a shoulder, $e$, which bears against the shoulder $b'$, a groove on its back to receive the tongue on the rear edge of the socket, and a tongue on its front to enter the groove on the front edge of the same.

$e'$ is the projecting point of the tooth, and $e^2$ $e^2$ curved re-enforcing ridges along its sides, toward which ridges the tooth thickens from its edges.

To insert the tooth, it is first placed in its socket and the locking-piece turned until the shoulders $b$ and $c$ bear against each other, the butt of the locking-piece being provided as usual, with the inclined slit to make it hold firmly in place.

It is evident, as the rear edges of the tooth and its socket are more convex than their front edges are concave, that there will be more resistance to bending or breaking in the former than if said edges were parallel, and that the shoulder $b'$ will bear against the shoulder $e$ more in the line of pressure.

By putting in the same amount of metal as in a tooth with parallel edges, the tooth will be wider than the former at its center and narrower at its ends, and will yet be much stiffer and better sustained by its socket. The side ridges, moreover, add to its resistance against lateral strain.

Having described this invention, what I claim, and desire to secure by Letters Patent, is—

1. In combination with a saw-tooth having its rear edge formed on an arc of less radius than that upon which the front edge is formed, a saw plate recessed to correspond with said rear edge, and a locking-plate whose curved bearing-face comforms to the arc of front edge of the tooth, substantially as specified.

2. In combination with a saw-tooth having its rear edge made on the arc of a circle of less radius than that on which its front edge is made, provided with re-enforcing side ridges tongued on one edge and grooved on the opposite edge, a socket of corresponding shape formed by the locking and saw plates, substantially as specified.

In testimony whereof I affix my signature in presence of two witnesses.

ANDREW KRIEGER.

Witnesses:
C. E. MORRIS,
J. A. KIGHT.